United States Patent

Ruff

[11] Patent Number: 5,168,981
[45] Date of Patent: Dec. 8, 1992

[54] BELT CHAIN

[75] Inventor: Leonard Ruff, Pasco, Wash.

[73] Assignee: Edwin Ruff, Kennewick, Wash.

[21] Appl. No.: 717,271

[22] Filed: Jun. 18, 1991

[51] Int. Cl.[5] .................................. B65G 17/06
[52] U.S. Cl. .................................. 198/850; 198/728
[58] Field of Search .............. 198/803.2, 728, 731, 198/844.1, 848, 850; 209/307, 308, 665

[56] References Cited

U.S. PATENT DOCUMENTS

| 103,806 | 5/1970 | Whiting. | |
|---|---|---|---|
| 705,528 | 7/1902 | Heineke. | |
| 2,158,705 | 5/1939 | Randolph | 209/665 |
| 2,405,530 | 8/1946 | Sullivan | 198/850 |
| 2,906,395 | 9/1959 | Greer | 198/850 |
| 4,553,663 | 11/1985 | Johnson | 198/731 |

FOREIGN PATENT DOCUMENTS 975635 11/1964 United Kingdom ............... 198/848

*Primary Examiner*—Joseph E. Valenza
*Attorney, Agent, or Firm*—Wells, St. John, Roberts, Gregory & Matkin

[57] ABSTRACT

A belt chain includes transverse links having non-circular end sections received within complimentary apertures in the core of supporting longitudinal belts. The belt cores are reinforced by longitudinal cords encircling adjacent apertures and twisted between them. When assembled in a conveyor, the resulting belt tension causes the cords to contract about the end sections of the links supported by them, thereby preventing rotation of the links about their transverse axes.

9 Claims, 2 Drawing Sheets

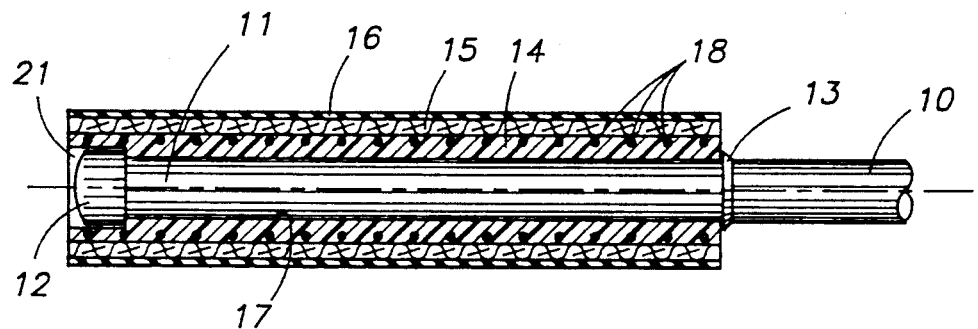
_Fig 2_
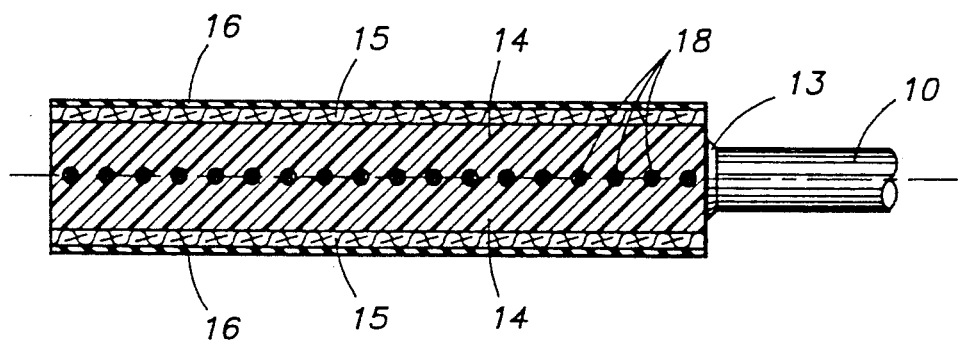
_Fig 3_
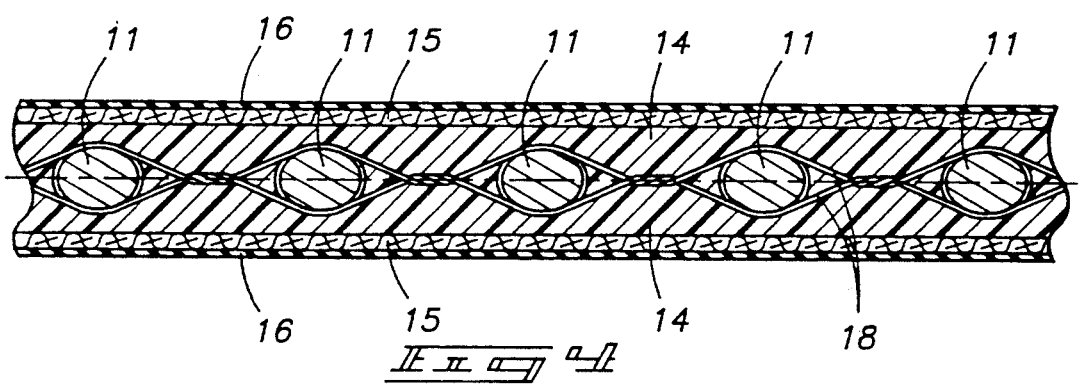
_Fig 4_

BELT CHAIN

TECHNICAL FIELD

This disclosure pertains to belt chains of the type used in agricultural processing and harvesting conveyors.

BACKGROUND OF THE INVENTION

Steel hook chains are still widely used in agricultural processing and harvesting conveyors. Such conveyors are made from interconnected transverse links having outer ends hooked to one another to form a conveyor structure. Hook chains have now been supplanted in many applications by belt chains, in which the outer ends of spaced transverse conveyor links are secured along flexible supporting belts.

In modern belt chains, the links are formed of steel and the belts are formed of rubber traction belting including parallel plies of directionally woven fabric vulcanized with layers of rubber. The outer ends of the links are typically secured to the belting by rivets that pass through the belting and an opposed retaining plate. Because of the high stresses to which such conveyors are subjected during use, the construction of the belt chain is confined to factory operations. Field repair of such belt chains is limited to replacement.

The present invention has been designed to facilitate assembly and repair of belt chains without requiring factory operations. The user can replace any desired link or a belt without the specialized equipment currently necessary for attaching the links by use of steel rivets.

BRIEF DESCRIPTION OF THE DRAWINGS

The preferred embodiment of the invention is illustrated in the accompanying drawings, in which:

FIG. 2 is an enlarged transverse sectional view taken along line 2—2 in FIG. 1;

FIG. 3 is an enlarged fragmentary sectional view taken along line 3—3 in FIG. 1; and FIG. 4 is an enlarged fragmentary sectional view taken along line 4—4 in FIG. 1.

DETAILED DESCRIPTION OF THE PREFERRED EMBODIMENTS

Figure 1:
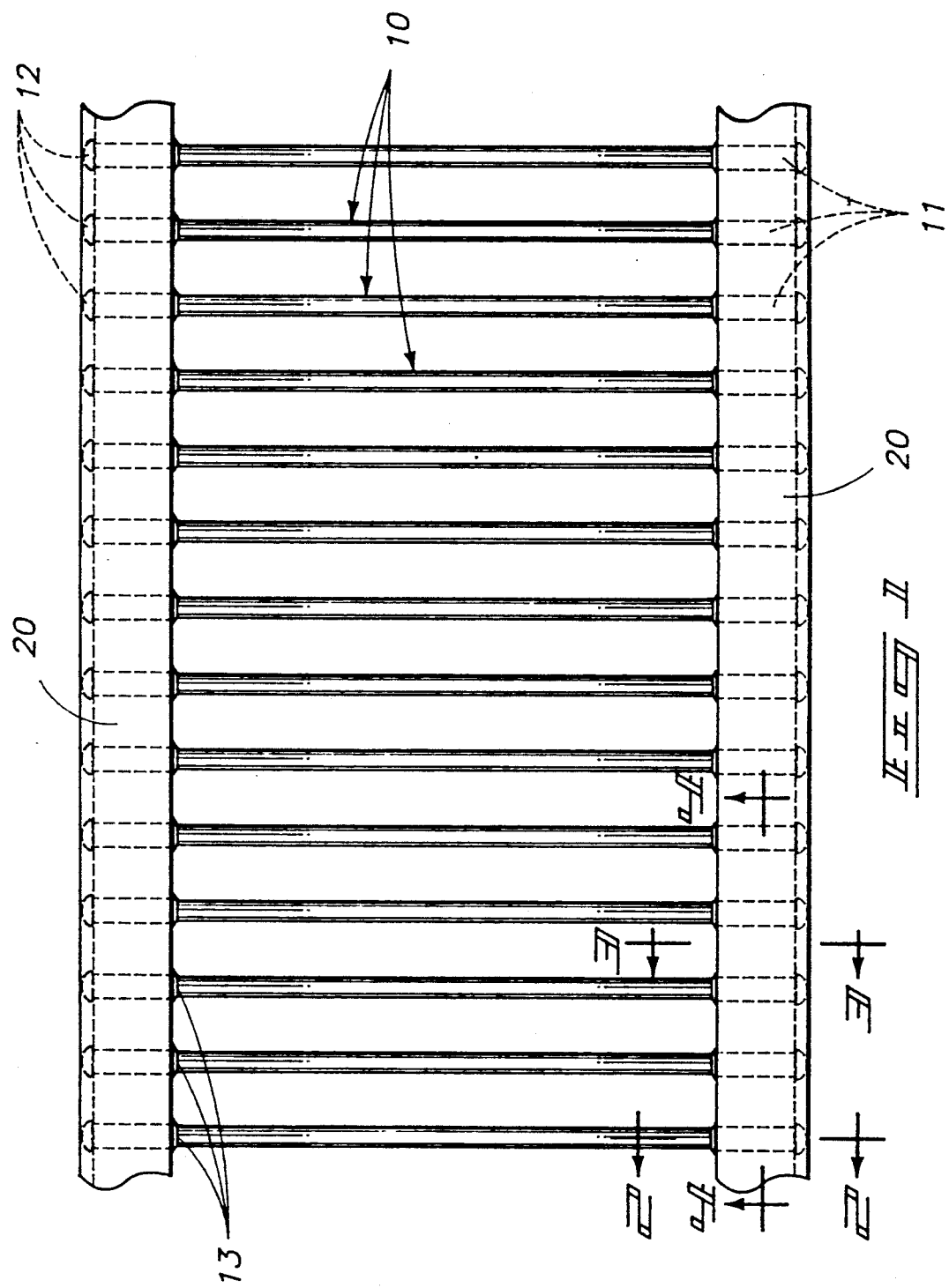
FIG. 1 is a fragmentary plan view of a belt chain constructed according to this disclosure.

The following disclosure of the invention is submitted in furtherance with the constitutional purpose of the Patent Laws "to promote the progress of science and useful arts" (Article 1, Section 8).

FIGS. 1-4 illustrate the structure of the novel belt chain to which this disclosure is directed. It is designed to facilitate assembly of the belt chain. By eliminating use of rivets to attach the transverse rigid links to the longitudinal belts that interconnect them, it allows repairs and modifications to the belt chain to be effectively accomplished in the field without special tools.

As shown, the belt chain includes a plurality of transverse rigid links 10. Each link is in the form of a rod or bar having the cross-sectional configuration desired across the resulting conveyor flight. They can be made of metal or non-metallic materials suitable for the intended applications of the belt chain. The variations possible in the structural shapes and details of the links are well known in this area of technology. Further description of the various cross-sectional shapes and sizes that might be presented across the central functional areas of links 10 are not believed to be essential to an understanding of the present disclosure.

Each link 10 includes a pair of coaxial end sections 11 having outer surfaces generated about a link axis. The end sections 11 have a non-circular or oblong cross-sectional configuration to prevent unwanted rotation of the links 10 within the belts that support them. The configuration specifically illustrated in the drawings, as an example, is oval. Other non-circular cross-sectional configurations can be substituted in place of that shown.

The belt chain is completed by a pair of molded flexible longitudinal belts 20. Belts 20 transversely overlap the respective outer end sections 11 of the parallel links 10. Intermediate longitudinal belts (not shown) can be provided along the center of the links 10 when the conveyor width is such as to require intermediate connections between the rigid parallel links.

Each belt 20 has a plurality of open transverse apertures 17 molded across its width. They are spaced from one another along the length of the belting for individually receiving the outer end sections of the transverse links 10. The cross-sectional configurations of the open transverse apertures are complimentary in both size and shape to the cross-sectional configurations of the outer end sections 11 of the links 10.

The apertures 17 have inner surfaces generated about transverse axes extending across the width of the belt chain and spaced from one another along its length. They intersect and are open across each of the side edges of the belts 20. The end sections 11 of each transverse link 10 are received within coaxially aligned pairs of the apertures 17.

The outer end sections 11 of links 10 terminate in radial enlargements 12 adapted to interfere with the cross-sectional configuration of the apertures 17 in belts 20. The enlargements 12 are also overlapped by the width of belts 20 and are loosely received within enlarged recesses 21 formed at the outer ends of each aperture 17.

The outer end sections 11 originate in radial shoulders or enlargements 13, also adapted to interfere with the apertures 17. Enlargements 13 are designed to abut the inner edges of belts 20.

The purpose of enlargements 12 and 13 is to normally position links 10 with their oblong end sections 11 transversely located within apertures 17. Enlargements 12 permit the links 10 to be individually pulled from or inserted into belts 20, but normally retain the links 10 in an assembled condition in conjunction with enlargements 13 during use of the belt chain in a conveyor assembly.

The structure of each belt 20 can best be understood from FIGS. 2-4. The belting from which it is made includes a central core 14 and outer covers 16 having suitable frictional properties. A ply of woven reinforcing material, such as a layer of fabric 15, is provided within the surrounding flexible material. The reinforcing layer must have adequate flexibility and strength to withstand the usages of the belt in a conveyor. Nylon or polyester fabrics are typical of materials used for such reinforcing purposes, but the structure is not to be limited to any specific material choices. Likewise, the choice of flexible materials for the structure of the molded belts 20 is believed to be within the skill of those knowledgeable in the conveyor belting field.

Longitudinal flexible reinforcing means encircles each adjacent pair of apertures along the length of the belt in a path that periodically intersects a central plane through the belt and containing the axes of the apertures 17. As seen in FIGS. 2 and 3, the reinforcing means is shown as encircling flexible cords 18 embedded within core 14. The term "cord" is to be understood in a broad sense, including woven, twisted and single fibers of tensile materials suitable for interconnecting the links 10 within the core 14.

Each cord 18 encircles two adjacent apertures 17 and is twisted at 19 between longitudinally adjacent apertures. The cords 18 preferably extend continuously along the length of each belt 20, but can be fabricated from short lengths encircling two or more adjacent apertures. A plurality of cords 18 is transversely spaced across the width of each belt 20 to fully overlap the end sections 11 of links 10 received within the apertures 17.

The cords 18, which are preferably made from high-tensile strength metal, nylon or polyester materials, serve as longitudinal reinforcements for the core 14 and the molded apertures 17 formed within it. As the belts 20 are tensioned, the cords 18 will tend to "squeeze" the apertures 17 and the end sections 11 of the links 10 received in the apertures. Tensioning of belts 20 thereby results in increased gripping forces being exerted between the belts 20 and the oblong end sections 11 of links 10 to assure that the links 10 remain in place within the belt interiors. In addition, because of the non-circular shape of the end sections 11, these gripping forces also serve to prevent unwanted rotation of links 10 about their central transverse axes.

The belt chain can be readily assembled without special riveting or assembly tools. The end sections 11 of the individual links 10 can be pushed through the complementary apertures 17 in the desired lengths of belting. When assembled in a conveyor, the tension exerted on the belts 20 will result in the links 10 being securely gripped within them for load transmission purposes, further insuring against unwanted transverse movement of links 10 relative to the supporting belts 20.

This structure facilitates field replacement of links 10 and/or belts 20. The user can readily substitute belts or links as required, again without the need of any specialized tools.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

I claim:

1. A belt chain comprising:
   a plurality of transverse links, each link including a pair of coaxial end sections each having an outer surface configuration generated about a link axis;
   flexible longitudinal belts transversely overlapping the respective end sections of the links, each belt having planar uninterrupted opposed outer surfaces and a plurality of open transverse apertures having molded inner surfaces generated about transverse axes extending across its width and spaced from one another along its length;
   each aperture having an interior cross-sectional configuration that is complementary in both size and shape to the outer surface configuration of the end sections of the links;
   the end sections of each transverse link being received within coaxially aligned pairs of the apertures;
   longitudinal flexible reinforcing means embedded within the belts for providing longitudinal reinforcement to the belts, the flexible reinforcing means encircling each adjacent pair of apertures along the length of the belt; and
   the flexible reinforcing means comprising at least one longitudinal flexible cord embedded within the belt, the cord encircling each adjacent pair of apertures along the length of the belt and being interconnected at its intersections with a central plane through the belt that contains the axes of the apertures.

2. The belt chain of claim 1, wherein the cross-sectional configuration of the end sections and apertures is non-circular.

3. The belt chain of claim 1, wherein the end sections of the links terminate in radial enlargements adapted to abut one end of an aperture molded across the belts.

4. The belt chain of claim 1, wherein the end sections of the links originate in radial enlargements adapted to abut one end of an aperture molded across the belts.

5. The belt chain of claim 1, wherein the flexible reinforcing means further comprises a plurality of transversely spaced cords arranged across the full width of the belt.

6. Belting for a belt chain using a plurality of transverse links including a pair of coaxial end sections, each end section having a common non-circular cross-sectional configuration, the belting comprising:
   a flexible longitudinal belt having a plurality of open transverse molded apertures generated about transverse axes extending across its width and spaced from one another along its length adapted for individually receiving end sections of transverse links;
   the cross-sectional configuration of each aperture being complementary in both size and shape to the cross-sectional configuration of the link end sections; and
   longitudinal flexible reinforcing means embedded within the belt for providing longitudinal reinforcement to the belt, the flexible reinforcing means encircling each adjacent pair of apertures along its length;
   the flexible reinforcing means comprising at least one longitudinal flexible cord embedded within the belt, the cord encircling each adjacent pair of apertures along the length of the belt and being interconnected at its intersections with a central plane through the belt that contains the axes of the apertures.

7. The belting of claim 6, the flexible reinforcing means further comprising a plurality of transversely spaced flexible cords arranged across its full width.

8. A belt chain comprising:
   a plurality of transverse links, each link including a pair of coaxial end sections having outer surfaces generated about a link axis;
   flexible longitudinal belts transversely overlapping the respective end sections of the links, each belt having a plurality of open transverse molded apertures having inner surfaces generated about transverse axes extending across its width and spaced from one another along its length, the end sections of each transverse link being received within coaxially aligned pairs of the apertures;

the cross-sectional configuration of each aperture being complementary in both size and shape to the cross-sectional configuration of the end sections of the links; and flexible cords embedded within the belts and interconnecting the transverse links, wherein each aperture is encircled by a pair of the flexible cords, each pair of cords extending along the length of one of the belts, the cords of each pair being interconnected between the transverse apertures to provide increasing gripping forces against the transverse links in response to longitudinal belt tension.

9. The belt chain of claim 8, wherein the cords of each pair are twisted together between the transverse apertures.

* * * * *